Aug. 15, 1950  T. L. SMITH  2,518,829
PRESSURE SEALING MEMBER
Filed Jan. 26, 1948

INVENTOR.
TELFORD L. SMITH
BY
ATTORNEY

Patented Aug. 15, 1950

2,518,829

UNITED STATES PATENT OFFICE 2,518,829

PRESSURE SEALING MEMBER

Telford L. Smith, San Bruno, Calif.

Application January 26, 1948, Serial No. 4,316

1 Claim. (Cl. 285—115)

This invention relates to improvements in a pressure-sealing member.

In water mains and other strings of soil pipe, the pipes are not ordinarily threaded together, but are joined by what is known as a bell-and-barrel or bell-and-spigot joint: the male end (barrel or spigot) of one pipe is inserted into the female end (bell) of the succeeding pipe, and a jointing compound is poured into the space between them to seal the joint. When the pipe is newly laid or newly replaced and when water flows through the main not long after the jointing compound was poured, the pressure of the water is liable to force out the jointing compound and cause leaks. Moreover, water which comes into contact with the jointing compound or with impurities in it or in a packing ring protecting it may be contaminated thereby and so rendered unsafe for drinking.

Up to the time of this invention, no gasket or sealing member had been devised which could adequately protect the jointing compound from the pressure of the water and the water from contamination. Waddings such as hemp rope have been used for this purpose, but they have been unsterile and unsterilizable; moreover water has leaked through them. Ordinary types of gaskets inserted between the compound and the water, were bypassed or pushed out of place by the water. When hot lead is to be poured into the joint while water is flowing through the pipes, it is essential that no water pass through to the lead and explode the confined molten metal.

One further problem encountered, arises from the fact that the size of the pipe ends varies. No ordinary gaskets can fit tightly in every joint; it will be too large for some joints and too small for others. All these problems are solved by the present invention.

One object of this invention is to provide a sealing member suitable for the bell-and-barrel type of pipe joint, to seal off the water from the jointing compound and protect them from each other.

Another object of this invention is to provide a sealing member so constructed that an increase in pressure will force it into tighter engagement with the pipes and make it seal more thoroughly than ever.

Another object of this invention is to provide a self-sealing lock ring which adjusts itself to the normal variation in a particular size of pipe to give a tight fit in any joint in a string of pipe.

A further object of this invention is to provide a water lock ring which can easily be sterilized before insertion, for further protection of the water supply.

Other objects and advantages of the invention will become apparent from the following description of an illustrative embodiment of the invention, presented in accordance with U. S. Revised Statutes, Section 4888, without any intention to limit the claim to the particular embodiment described.

Figure 1:
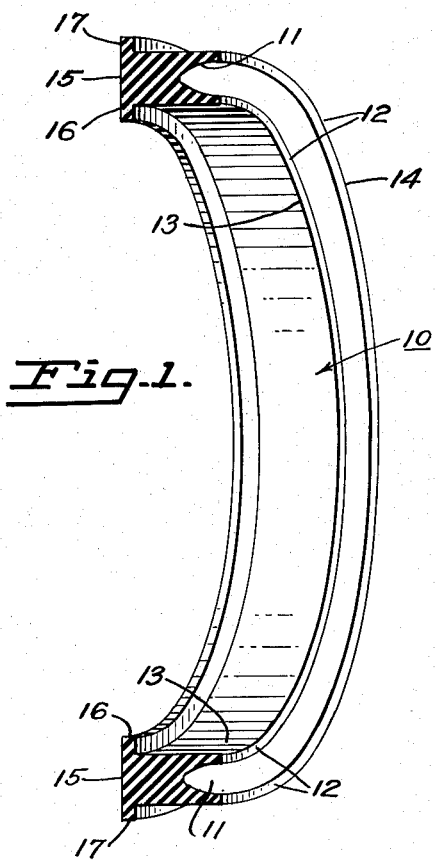
Fig. 1 is a view in perspective of part of a ring which embodies the principles of my invention; the ring is cut in half diametrically so as to show its shape, and the sealing position assumed by the radial flanges is shown in dotted lines.
Figure 2:
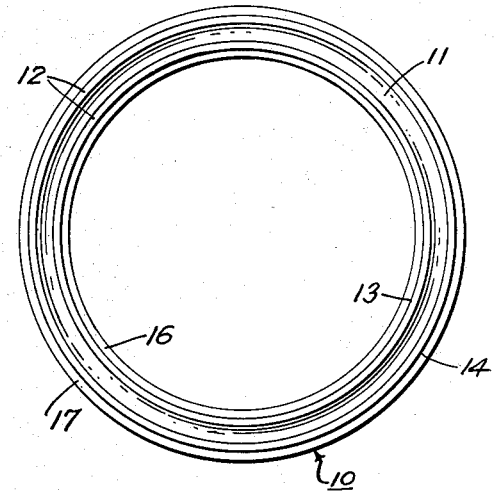
Fig. 2 is a plan view of the device shown in Fig. 1, the ring being shown complete.

The invention comprises a specially-formed integral ring 10, of resilient material such as rubber or a synthetic substitute for rubber. The ring 10 has a tapered trough 11 in that radial face 12, which is the pressure-facing end of the ring, and this trough 11 is bordered on either side by the concentric, resilient lips 13 and 14. At the other end 15 of the ring 10 are the oppositely-extending radial flanges 16 and 17.

Figure 3:
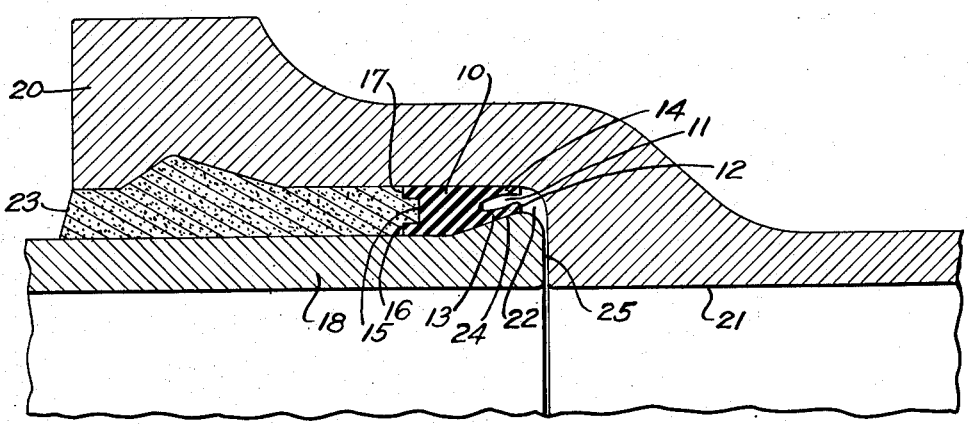
Fig. 3 is a view in elevation and in section of a part of a pipe juncture, in which the ring is inserted in position.

Fig. 3 shows the distortion of the ring 10 when it is inserted between the male end of one pipe 18 and the female end, or bell 20, of the other pipe 21. The flanges 16 and 17 are turned by the two pipes 18 and 21 into the axially-pointing position shown in Fig. 3 and shown in dotted lines in Fig. 1. The flange 17 rests against the inner surface of the bell 20, and the resiliency and elasticity of the flange 17 keep tending to make it resume its original molded shape, with the consequence that the entire flange 17 is pressed firmly against, and conforms to, the wall of the bell 20. The tendency of the flange 17 to return to its original radial position thus causes it to act as a pressure seal in the space 22 between the male end 18 and the bell 20. Similarly the tendency of the flange 16 to return to its original position pushes it against the outer surface of the male pipe 18 and seals that side of the space 22 between the pipe 18 and the bell 20. The jointing compound 23 is poured in after the ring 10 is in place between the pipe ends. It is effectively protected from contact with the water, which bears against the face 12 of the ring 10, so that hot lead may safely be poured in, and so that, if the ring 10 is sterilized, the water cannot be contaminated by seepage.

Whether or not the pipe 18 has a sloping rim 24 of the type shown in Fig. 3, is unimportant. In any event, the water flowing up through the slack space 25 between the pipes 18 and 21 and into the space 25 flows against the seal 10 and into the trough 11. The pressure of the water against the lips 13 and 14 tends to spread them, and any increase in water pressure thus increases the sealing pressure against the lips.

It will be seen from the foregoing description that the sealing ring 10 has three sealing portions: the main body portion acts like a normal gasket and gives strength and support to the other two portions; the flanges 16 and 17 form a pressure seal at the rear end 15 of the ring 10; and the concentric lips 13 and 14 form a pressure seal at the front end 12 of the ring 10. The sealing action of both these latter sealing portions is enhanced by increased pressure against them.

It will be apparent how easily the ring 10 can be sterilized; whereas it is impossible to sterilize the jointing compound 23. Moreover, it will also be apparent how the flexibility, resiliency, and shape of the flanges 16, 17 and the lips 13, 14 enable the ring 10 to fit and seal in spite of irregularity in the size of the pipes joined.

I claim:

A sealing member adapted to be inserted after the male and the female portions of a bell and spigot joint are coupled to provide an annular space to receive said sealing member, comprising an annular body portion of resilient impervious material; having on its end which first enters said bell a pair of axially extending pliant sealing lips projecting in general alignment with the outer and the inner periphery of said annular body portion; and having on its end which last enters said coupling, a pair of generally radially extending pliant sealing flanges, one of which extends inwardly beyond the inner periphery of said annular body portion and the other of which extends outwardly beyond the outer periphery of said annular body portion, whereby upon insertion of said sealing member within said bell, said radial sealing flanges will be deflected into sealing contact with the walls of said annular space to seal against any fluid passing said sealing member from the outside of the joint.

TELFORD L. SMITH.

REFERENCES CITED

The following references are of record in the file of this patent:

UNITED STATES PATENTS

| Number | Name | Date |
|---|---|---|
| 1,924,020 | Bihet | Aug. 22, 1933 |
| 2,226,067 | Morgan | Dec. 24, 1940 |
| 2,278,447 | Hyde | Apr. 7, 1942 |